United States Patent
Sugiura (10) Patent No.: US 6,510,602 B2
(45) Date of Patent: Jan. 28, 2003

(54) ROOF MOLDING FOR AN AUTOMOBILE AND METHOD OF TRIMMING THE SAME

(75) Inventor: Masatoshi Sugiura, Aichi (JP)

(73) Assignee: Inoac Corporation, Aichi (JP)

( * ) Notice: Subject to any disclaimer, the term of this patent is extended or adjusted under 35 U.S.C. 154(b) by 82 days.

(21) Appl. No.: 09/726,417

(22) Filed: Dec. 1, 2000

(65) Prior Publication Data

US 2001/0000016 A1 Mar. 15, 2001

Related U.S. Application Data

(62) Division of application No. 09/182,211, filed on Oct. 30, 1998, now Pat. No. 6,224,145.

(51) Int. Cl.⁷ .............................. B21B 1/46; B60R 13/00
(52) U.S. Cl. .................. 29/527.2; 29/557; 156/211; 296/210; 428/31
(58) Field of Search ..................... 29/527.2, 527.1, 29/557, 558; 156/211, 245, 254; 296/210, 213, 216.09; 428/31

(56) References Cited

U.S. PATENT DOCUMENTS

| | | | | |
|---|---|---|---|---|
| 3,136,676 A | * | 6/1964 | Fisch | 156/156 |
| 3,825,459 A | * | 7/1974 | Taylor | 156/244.18 |
| 3,970,498 A | * | 7/1976 | Loew | 156/211 |
| 4,174,986 A | * | 11/1979 | Jennings | 156/211 |
| 4,619,847 A | * | 10/1986 | Jackson | 428/31 |
| 4,778,550 A | * | 10/1988 | Barton et al. | 156/211 |
| 4,930,279 A | | 6/1990 | Bart et al. | 296/213 |
| 5,013,083 A | | 5/1991 | Yada et al. | 296/210 |
| 5,028,460 A | * | 7/1991 | Kimura et al. | 428/31 |
| 5,074,610 A | | 12/1991 | Tamura et al. | 296/213 |
| 5,085,902 A | * | 2/1992 | Yada et al. | 428/31 |
| 5,108,681 A | | 4/1992 | Cakmakci | 264/151 |
| 5,240,751 A | * | 8/1993 | Cakmakci | 428/31 |
| 5,468,438 A | * | 11/1995 | Yada | 156/247 |

FOREIGN PATENT DOCUMENTS

| | | | |
|---|---|---|---|
| EP | 0 904 914 A2 | * 3/1999 | |
| JP | 05 050532 | 3/1993 | B29D/31/00 |

* cited by examiner

Primary Examiner—Gregory M. Vidovich
Assistant Examiner—Marc Jimenez
(74) Attorney, Agent, or Firm—Sughrue Mion, PLLC (57) ABSTRACT

A roof molding for an automobile consists of an extruded mold product 10a in which a leg portion 11 and a decorative portion 15 formed on the upper end of the leg portion are integrally formed. A metal core member 12 is embedded in the leg portion. The leg portion is partially cut away in a range of a predetermined length from an end of the extruded mold product, in accordance with the depth of an end part of the groove of the roof, the metal core member in the vicinity of an end part 10b of the extruded mold product is cut away, and the end part from which the metal core member has been cut away is rearward bent by a bending process.

12 Claims, 7 Drawing Sheets

ROOF MOLDING FOR AN AUTOMOBILE AND METHOD OF TRIMMING THE SAME

This is a Divisional Application of application Ser. No. 09/182,211 filed Oct. 30, 1998 now U.S. Pat. No. 6,224,145, the disclosure of which is incorporated herein by reference.

BACKGROUND OF THE INVENTION

1. Field of the Invention

The invention relates to a roof molding for an automobile and a method of terminating the roof molding.

2. Description of the Related Art

Figure 9:
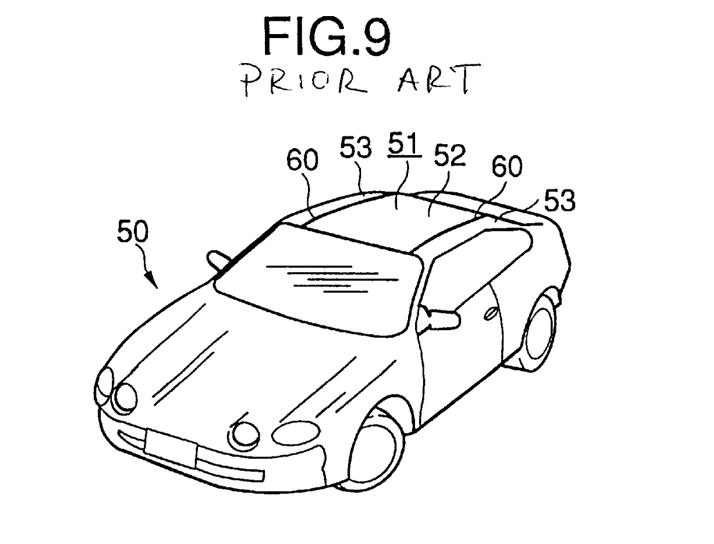
FIG. 9 is a perspective view of an example of an automobile to which a roof molding is attached.
Figure 10:
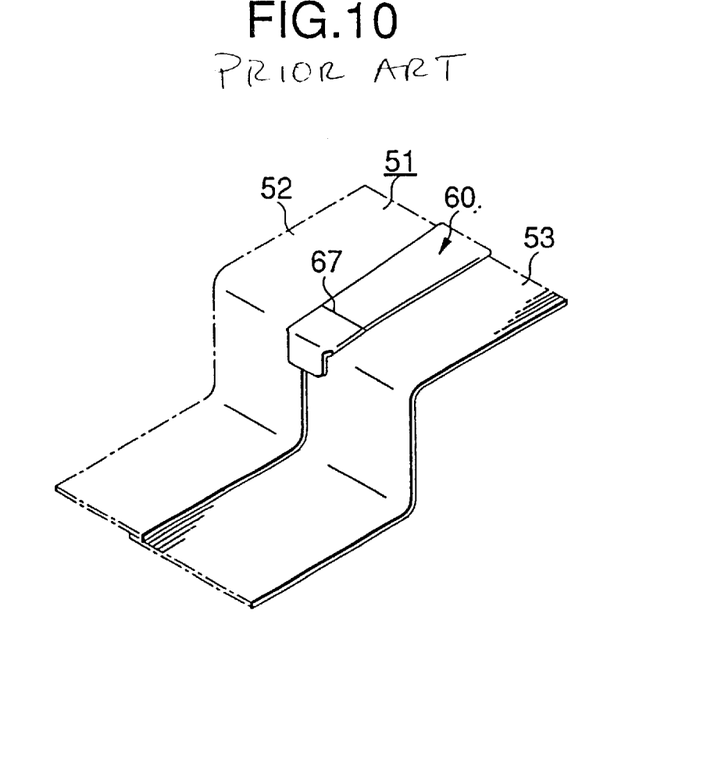
FIG. 10 is an enlarged view of a part of the roof.
Figure 11:
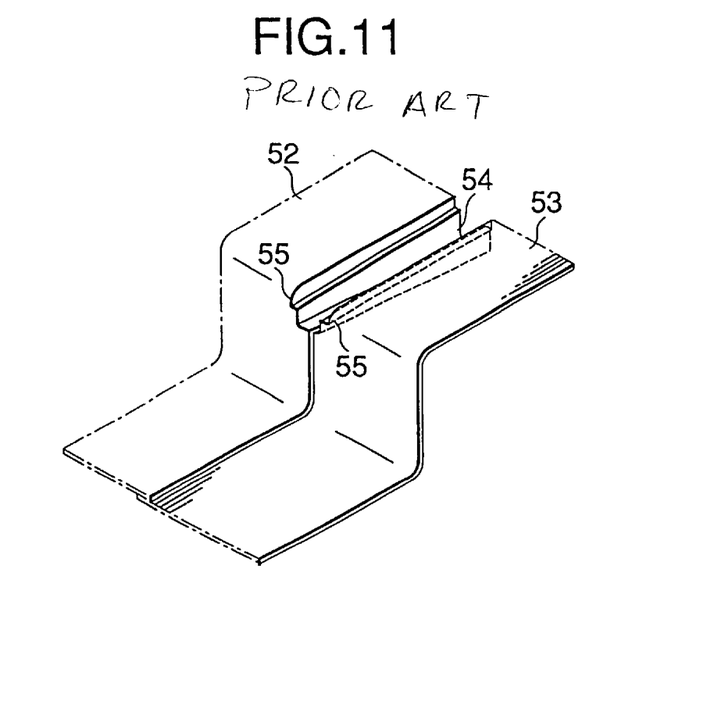
FIG. 11 is a view showing the roof from which the roof molding of FIG. 10 is removed away.

As shown in FIG. 9 illustrating a roof and FIG. 10 enlargedly illustrating a part of the roof, a roof molding 60 is often attached to the roof 51 of an automobile 50. As seen from FIG. 11 illustrating a part of the roof from which the roof molding 60 is removed away, in order to hide a join line along which a roof panel 52 and an outer side panel 53 are integrally joined together, the roof molding 60 is fitted into a groove 54 formed in the joint of the panels 52 and 53.

Figure 12:
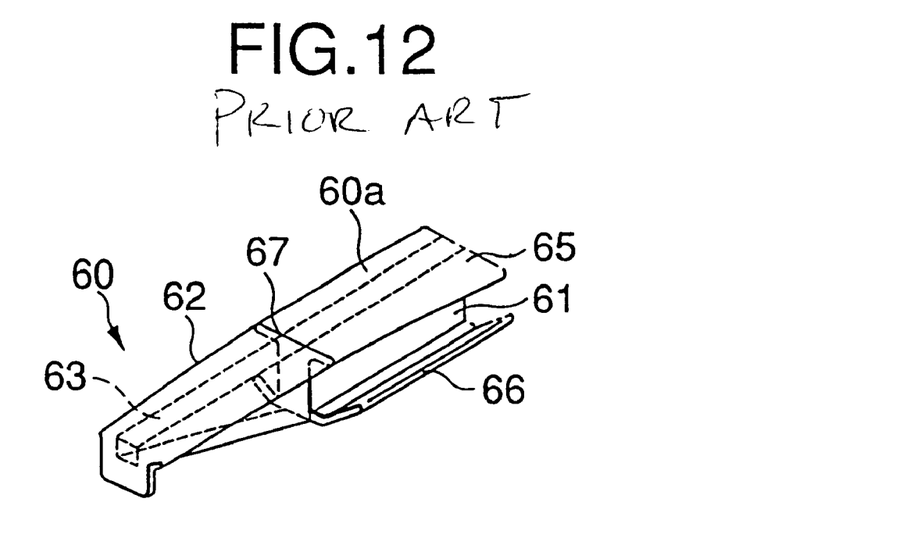
FIG. 12 is a perspective view showing a terminal of a roof molding of the prior art.
Figure 13:
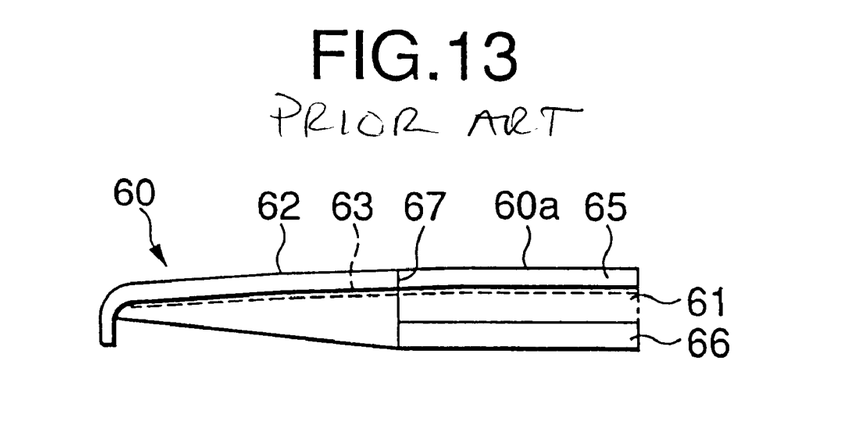
FIG. 13 is a side view of the terminal of the roof molding.

As seen from FIG. 12 and FIG. 13 which is a side view of FIG. 12, the roof molding 60 comprises a leg portion 61 and a decorative portion 65 which is formed on the upper end of the leg portion 61. The roof molding is attached to the groove 54 of the joint so that the leg portion 61 is inserted into the groove 54 and the decorative portion 65 closes the groove 54. In order to correctly attach and hold the roof molding 60 to and by the groove 54 of the joint, a metal core member 63 is often longitudinally embedded in the leg portion 61. The reference numeral 66 designates a lip (fin) which is formed longitudinally on each of the side faces of the lower part of the leg portion 61 so as to ensure the fixation of the leg portion to the groove 54.

Concerning with the groove joining the roof, if the groove is press-molded in the same depth as all length, the groove is broken at upper corners 55. Therefore, the depth of the groove 54 is gradually reduced as moving toward each of the ends of the groove 54. When a molding obtained by simply cutting a long extruded mold product into a predetermined length is used as the roof molding 60, therefore, the lower end of the leg portion 61 interferes with the automobile body, so that the roof molding 60 cannot be correctly attached. As a countermeasure, recently, a technique has been proposed in which, as shown in FIGS. 12 and 13, terminal portions 62 conforming to the depth of the ends of the groove 54 are formed by injection molding integrally with a long extruded mold product 60a that has been cut into a predetermined length.

However, the technique in which the terminal portions 62 are injection-molded has a problem in that join lines 67 are formed in the surface of the end parts of the roof molding or between the extruded mold product 60a and the terminal portions 62, thereby impairing the appearance of the roof molding. Furthermore, the resin of the extruded mold product 60a is different in shrinkage percentage from that of the terminal portions 62 which are injection-molded, and hence the part in the vicinity of each of the join lines 67 may be caused to crack by a difference in amount of thermal contraction, deterioration, or another phenomenon. According to circumstances, the terminal portions 62 are separated from the extruded mold product 60a.

In some cases, the roof 51 is largely curved in the vicinities of the front and rear ends toward the inside of the automobile. In such a case, also the groove 54 of the roof has a largely curved shape at the ends. Therefore, there arises a problem in that the roof molding 60 which is originally linear hardly elongates so as to conform to the shape of the groove. To comply with this, the following method may be employed. Notches are formed in the back side of each terminal portion 62 which is injection-molded, so that the terminal portion is easily bent. While the terminal portion 62 is bent so as to conform to the shape of the groove 54 of the roof, the terminal portion 62 is bonded and fixed to the bottom face of the groove 54 of the roof by a double-coated adhesive tape or an adhesive agent.

In this method, however, the terminal portion 62 which is originally linear is bent in a slightly forced manner and then bonded and fixed to the groove 54. Therefore, the method has problems in that the bent shape may be varied depending on the temperature of the automobile body during the attaching work, and that the bent shape may be returned to the original shape as a result of a temperature change after attachment.

SUMMARY OF THE INVENTION

The invention has been conducted in view of these problems. It is an object of the invention to provide a roof molding for an automobile in which a terminal portion is excellent in appearance and which has superior durability, and a method of trimming the roof molding.

The invention proposed herein include that relating to a roof molding for an automobile and that relating to a method of trimming the roof molding. The invention relates to a roof molding for an automobile, consisting of an extruded mold product in which a leg portion and a decorative portion formed on an upper end of the leg portion are integrally formed, a metal core member being embedded in the leg portion, the leg portion being fitted into a groove of an outer face of a roof of an automobile, the decorative portion closing the groove, wherein the leg portion is partially cut away in a range of a predetermined length from an end of the extruded mold product, in accordance with a depth of an end part of the groove of the roof, the metal core member in the vicinity of an end part of the extruded mold product is cut away, and the end part from which the metal core member has been cut away is rearward bent by a bending process.

The invention relates to a roof molding for an automobile, consisting of an extruded mold product in which a leg portion and a decorative portion formed on an upper end of the leg portion are integrally formed, a metal core member being embedded in the leg portion, the leg portion being fitted into a groove of an outer face of a roof of an automobile, the decorative portion closing the groove, wherein the leg portion is partially cut away in a range of a predetermined length from an end of the extruded mold product, in accordance with a depth of an end part of the groove of the roof, slits are formed in a back face of the cutaway part, the metal core member in the vicinity of an end part of the extruded mold product is cut away, the part in which the slits are formed is bent into a shape corresponding to the end part of the groove of the roof by a bending process, and the end part from which the metal core member has been cut away is rearward bent.

The invention relates to a roof molding for an automobile, wherein an open end of the slits is closed and fixed.

The invention relates to a method of trimming a roof molding for an automobile, consisting of an extruded mold product in which a leg portion and a decorative portion formed on an upper end of the leg portion are integrally formed, a metal core member being embedded in the leg portion, the leg portion being fitted into a groove of an outer face of a roof of an automobile, the decorative portion closing the groove, the method comprising: a cutting step of partially cutting away the leg portion in a range of a predetermined length from an end of the extruded mold product, in accordance with a depth of an end part of the groove of the roof, and cutting away the metal core member in the vicinity of an end part of the extruded mold product; and a bending step of rearward bending the end part from which the metal core member has been cut away, and heat is applied thereon.

The invention relates to a method of trimming a roof molding for an automobile, consisting of an extruded mold product in which a leg portion and a decorative portion formed on an upper end of the leg portion are integrally formed, a metal core member being embedded in the leg portion, the leg portion being fitted into a groove of an outer face of a roof of an automobile, the decorative portion filling the groove, the method comprising: a cutting step of partially cutting away the leg portion in a range of a predetermined length from an end of the extruded mold product, in accordance with a depth of an end part of the groove of the roof, forming slits in a back face of the cutaway part, and cutting away the metal core member in the vicinity of an end part of the extruded mold product; and a bending step of bending the part in which the slits are formed into a shape corresponding to the end part of the groove of the roof, and warping backward the end part from which the metal core member has been cut away, and heat is applied thereon.

The invention relates to a method of trimming a roof molding for an automobile, wherein, in the bending step, a hot plate is inserted into the slits to thermally fuse the slits, the hot plate is then removed away, and the part in which the slits are formed is bent, thereby closing and welding an open end of the slits.

The invention relates to a method of trimming a roof molding for an automobile, wherein, in the bending step, an adhesive agent is charged into the slits, and the part in which the slits are formed is then bent, thereby closing and fixing an open end of the slits.

DETAILED DESCRIPTION OF THE PREFERRED EMBODIMENTS

Hereinafter, the invention will be described in detail with reference to the accompanying drawings.

Figure 1:
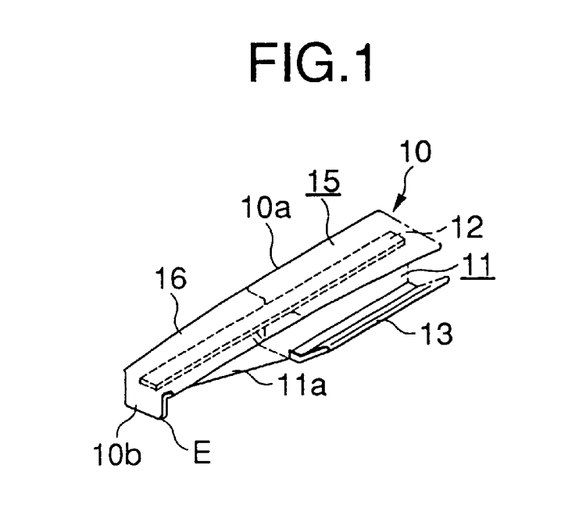
FIG. 1 is a perspective view of main portions of an example of the roof molding for an automobile of the invention.
Figure 2:
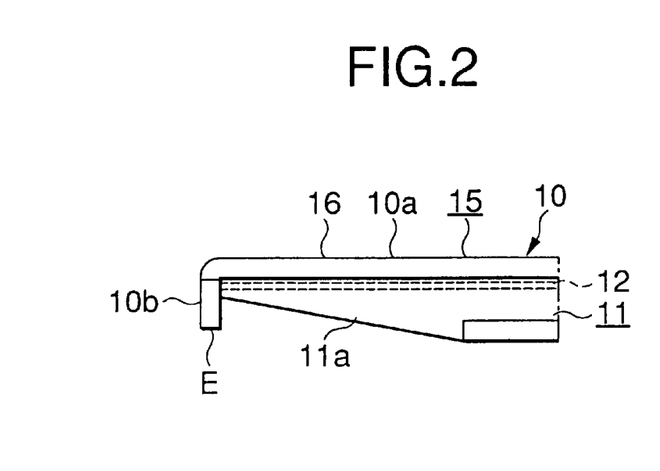
FIG. 2 is a side view of the roof molding.
Figure 3:
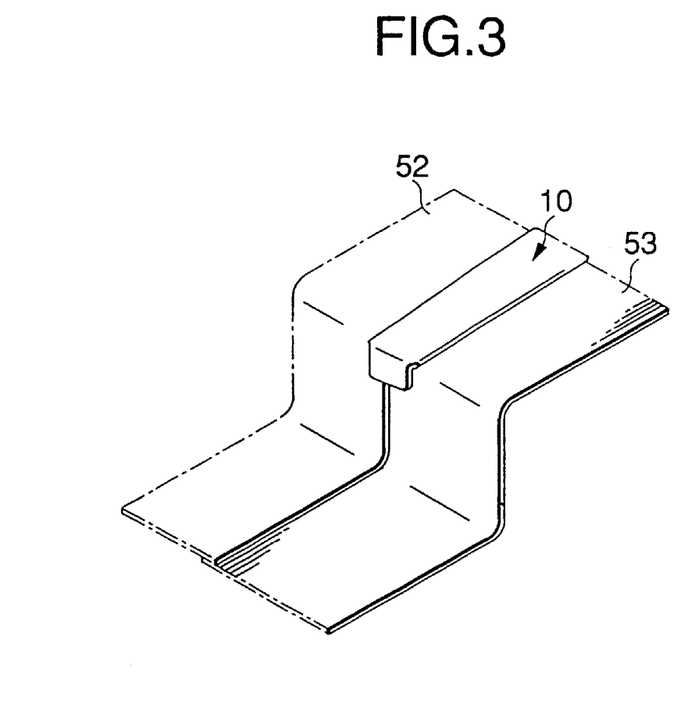
FIG. 3 is a perspective view of main portions in a state where the roof molding is attached to a groove of a roof.
Figure 4A:
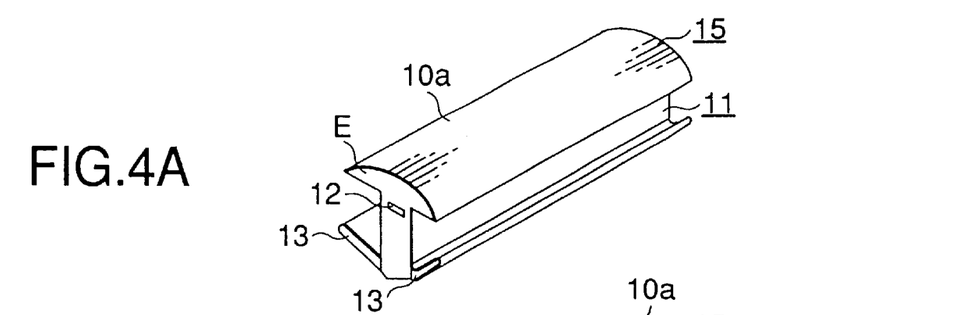
FIGS. 4A to 4E are views showing stages of a cutting step of the method of trimming a roof molding for an automobile of the invention.
Figure 4B:
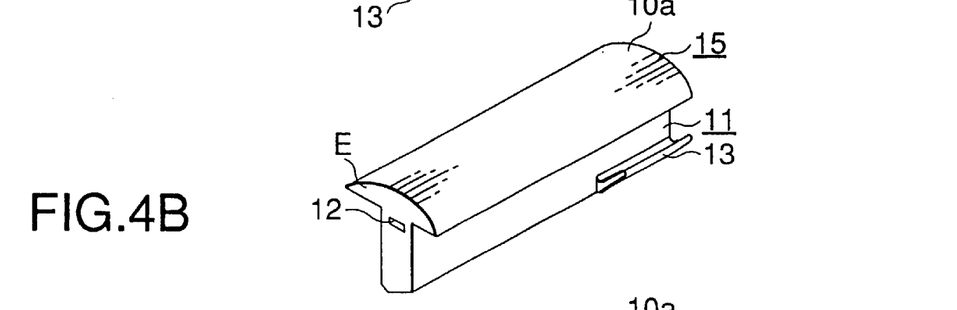
Figure 4C:
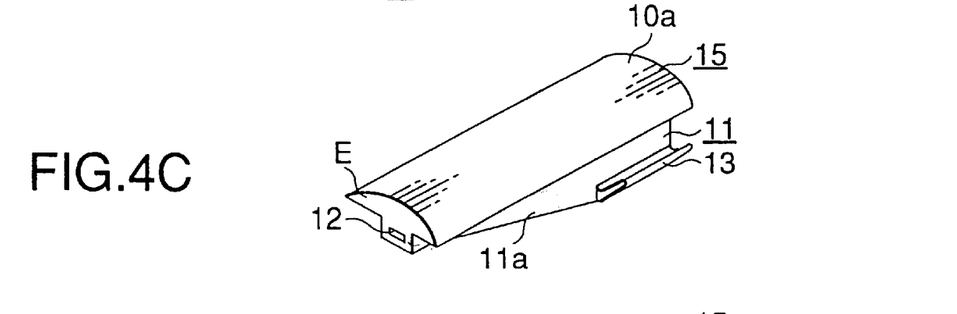
Figure 4D:
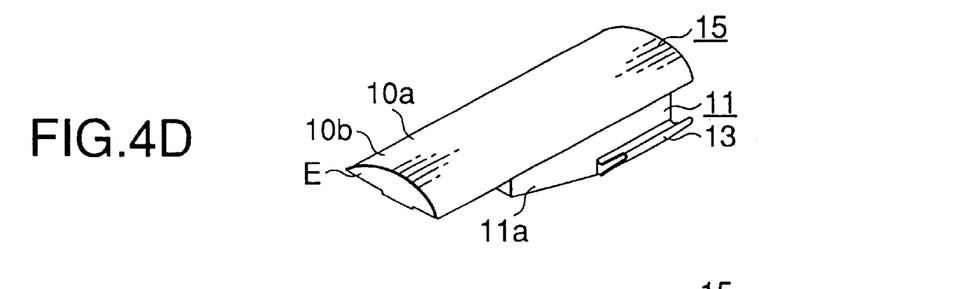
Figure 4E:
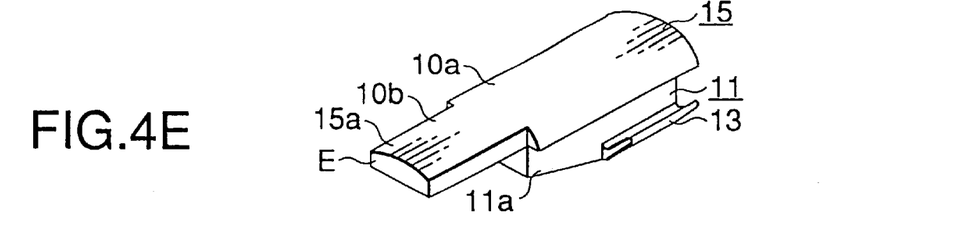
Figure 5A:
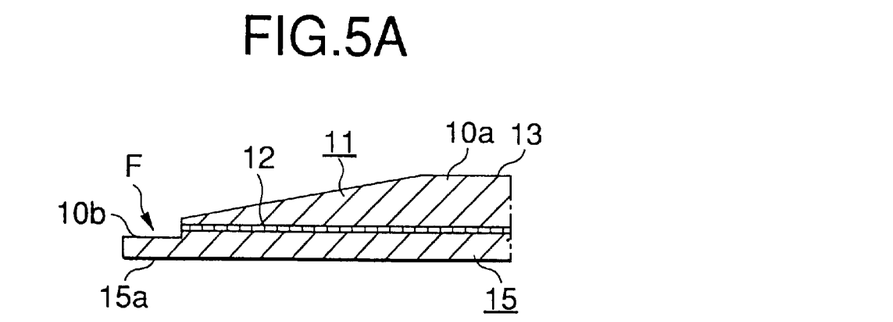
FIGS. 5A and 5B are section views showing a subsequent bending step.
Figure 5B:
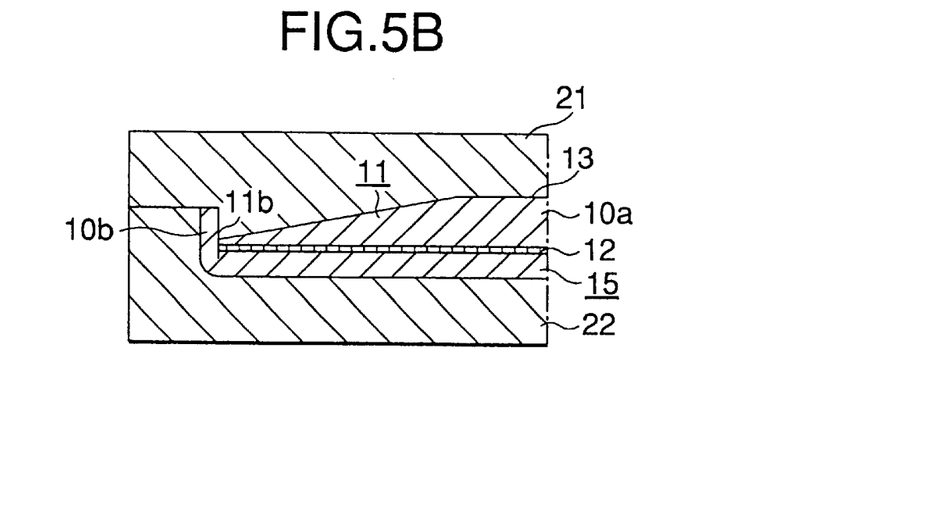
Figure 6:
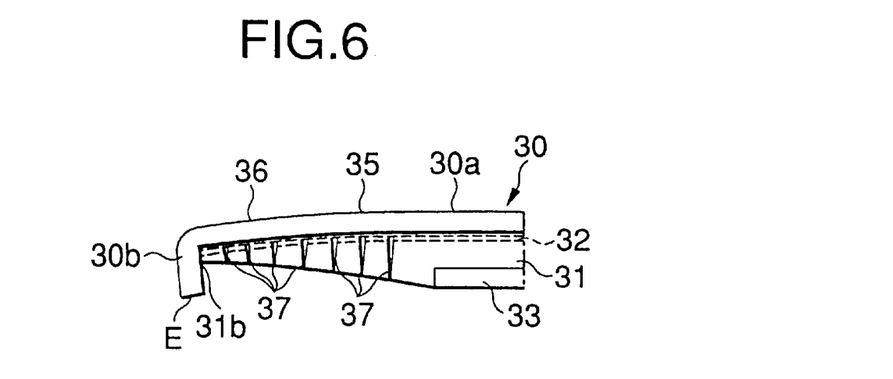
FIG. 6 is a side view of main portions of an example of the roof molding for an automobile of the invention.
Figures 7A, 7B:
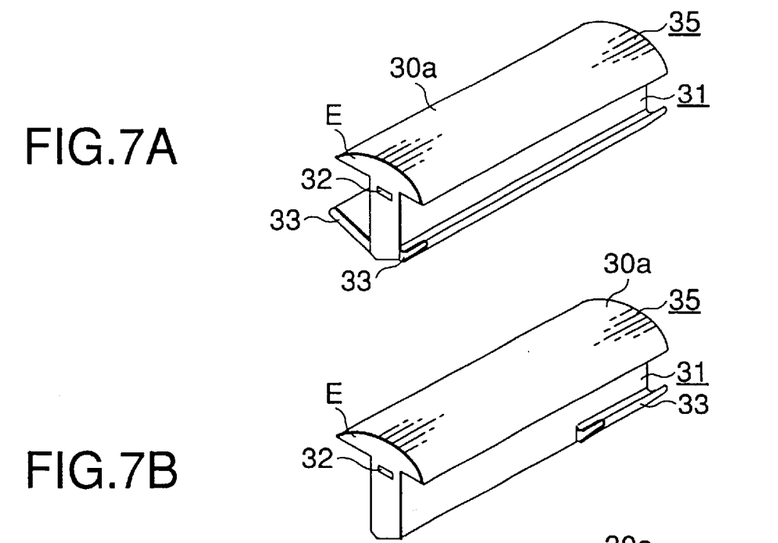
FIGS. 7A to 7E are views showing stages of a cutting step of the method of trimming a roof molding for an automobile of the invention.
Figure 7C:
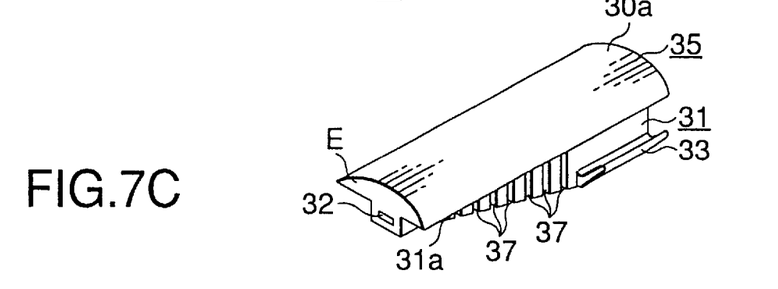
Figure 7D:
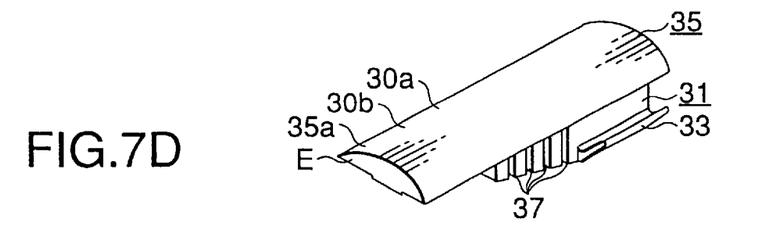
Figure 7E:
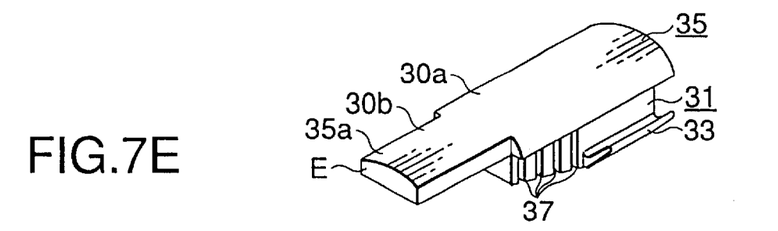
Figure 8A:
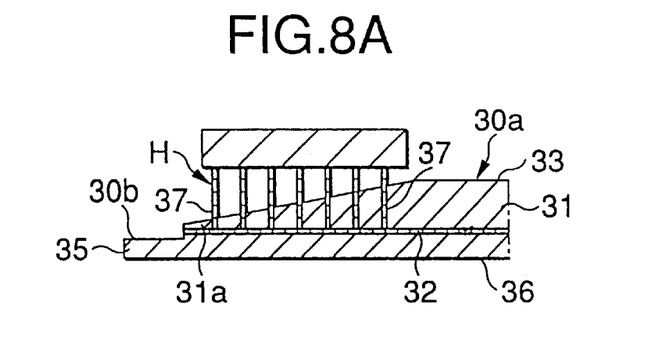
FIGS. 8A and 8B are sections view showing stages of a subsequent bending step.
Figure 8B:
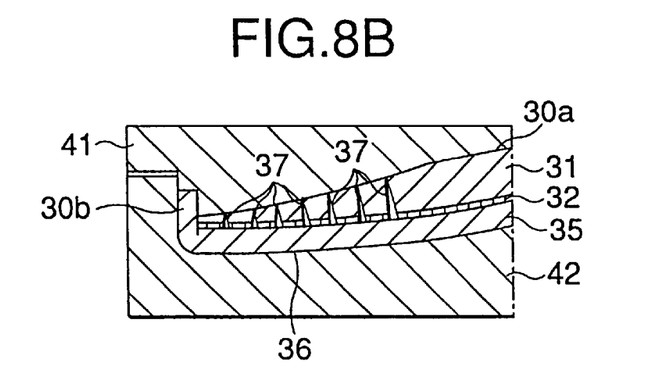

FIG. 1 is a perspective view of main portions of an example of the roof molding for an automobile of the invention, FIG. 2 is a side view of the roof molding, FIG. 3 is a perspective view of main portions in a state where the roof molding is attached to a groove of the roof of an automobile, FIG. 4 is a view showing stages of a cutting step of the method of trimming a roof molding for an automobile of the invention, FIG. 5 is a section view showing a bending step, FIG. 6 is a side view of main portions of an example of the roof molding for an automobile of the invention, FIG. 7 is a view showing stages of a cutting step of the method of trimming a roof molding for an automobile of the invention, and FIG. 8 is a section view showing stages of a bending step of the method.

First, an example of the roof molding for an automobile of the invention, and that of the trimming method of the invention will be described.

As shown in FIGS. 1 and 2, in the roof molding 10 for an automobile of the invention, a leg portion 11 in which a metal core member 12 is embedded, and a decorative portion 15 disposed on the upper end of the leg portion 11 are integrally formed. The roof molding is configured so that the leg portion 11 is attached to the groove 54 of the roof of an automobile such as shown in FIG. 11, and the decorative portion 15 closes the groove 54. FIG. 3 shows a state where the roof molding 10 is fitted into the groove of the roof.

The roof molding 10 is configured by forming an extruded mold product 0a shown in FIG. 4A in which the leg portion 11 and the decorative portion 15 are integrally formed and which is made of a thermoplastic resin and has a constant section shape, into a shape shown in FIGS. 1 and 2.

Specifically, the leg portion 11 is partially cut away in a range of a predetermined length from an end E of the extruded mold product 10a so that the decorative portion 15 remains existing, in accordance with the depth of the end part of the groove 54 of the roof. The metal core member 12 in the vicinity of end part 10b of the extruded mold product is cut away. The end part 10b from which the metal core member has been cut away is rearward bent by a bending process in which heat is applied, thereby forming a terminal 16. The reference numeral 11a designates a part of the leg portion 11 which has been cut away in accordance with the depth of the end part of the groove 54 of the roof. In this example, the cutaway amount is gradually increased so that the leg portion 11a becomes shorter as moving toward the vicinity of the end part 10b of the extruded mold product, and, in the vicinity of the end part 10b, the leg portion 11a is thoroughly removed away together with the metal core member 12.

A lip 13 made of a soft resin is formed integrally with each of the side faces of the lower end of the leg portion 11 in order that, when the leg portion 11 is inserted into the groove 54 of the roof, the leg portion is fixedly contacted with the inner wall of the groove 54 so as to stably hold the roof molding 10. The decorative portion 15 is set to have a size sufficient for closing the groove 54.

The whole of the roof molding 10 having the above-described shape is formed by a single extruded mold product, and no terminal member configured by injection molding is attached to the end of the extruded mold product. Therefore, no parting line exists in the decorative portion 15 and the appearance of the decorative portion is excellent. Since a terminal member is not joined to the extruded mold product, moreover, there is no fear that such a terminal member is separated from the extruded mold product because of a difference in shrinkage percentage.

Next, the method of trimming the roof molding 10 according to the invention will be described. The trimming method comprises a cutting step and a bending step.

FIGS. 4A to 4E show the cutting steps. An example of the extruded mold product 10a used in the step is shown in FIG. 4A. The extruded mold product 10a is previously obtained by cutting into a predetermined length an article that has the leg portion 11 in which the metal core member 12 is embedded, and the decorative portion 15, and that is continuously extruded so as to have a constant section shape.

In the cutting step, the leg portion 11 of the extruded mold product 10a is cut away in a range of a predetermined length from the end E of the extruded mold product. The range and degree of the cutting are determined in accordance with the length of the groove 54 in which the depth is changed, and also with the change of the depth.

In the cutting operation, as shown in FIG. 4B, the lips 13 are first removed away in a range of the predetermined length from the end E of the leg portion 11 of the extruded mold product 10a. The leg portion 11 in the area where the lips 13 are removed away is cut away as shown in FIG. 4C. The groove 54 of the roof is often formed so as to be shallower as moving toward the end of the roof of the automobile. In the cutting operation, therefore, also the extruded mold product 10a is slantly cut away so that the length of the leg portion 11 is gradually reduced as moving toward the end E. The reference numeral 11a designates the leg portion which is slantly cut away and has a reduced length at the end E.

Thereafter, as shown in FIG. 4D, the metal core member 12 is removed away together with the short leg portion in a range of a predetermined length from the end E of the leg portion 11 the length of which has been adjusted as a result of the previous cutting operation. In the end part 10b of the extruded mold product 10a in the area where the metal core member 12 is removed away, only the decorative portion 15a remains. The remaining decorative portion 15a is thereafter bent so as to be used for closing the end of the groove 54 of the roof. The removal of the metal core member 12 is conducted in a range of a suitable length which is required for the operation of bending the decorative portion 15a and which is measured from the end of the extruded mold product 10a. In the end part 10b of the extruded mold product 10a from which the metal core member 12 is removed away, both the sides are cut away as shown in FIG. 4E in order to facilitate the insertion of the product into the groove 54 of the roof.

The bending step is then conducted. In the bending step, the extruded mold product 10a which has undergone the cutting operation of the leg portion as described above is processed in the following manner. As shown in FIG. 5A, first, the base F of the end part 10b from which the metal core member 12 has been cut away is heated from the back side by a heater or hot air, so that the resin of the base is softened, thereby causing the back face to fuse. As shown in FIG. 5B, therefore, the terminal of the extruded mold product 10a is placed in pressing dies 21 and 22 having a die face corresponding to the terminal shape of the roof molding 10, and a pressing process is then conducted, thereby rearward bending the end part 10b from which the metal core member 12 has been removed away. From the viewpoint of preventing the metal core member 12 from being corroded, it is preferable to weld the end part 10b to the tip end 11b of the leg portion 11 from which the metal core member is not cut away. Alternatively, the end part 10b may be heated on the pressing die 22.

The end part 10b of the extruded mold product 10a is cooled so as to fix its shape, and the resulting extruded product is then taken out from the pressing dies 21 and 22. As a result, the terminal of the roof molding 10 shown in FIGS. 1 and 2 is obtained.

Next, an example of the roof molding for an automobile of the invention, and that of the method of trimming the roof molding of the invention will be described.

In the roof molding 30 for an automobile of the invention shown in FIG. 6, an extruded mold product 30a which has the same shape as the extruded mold product 10a in the embodiment of the invention is used, and the terminal has the following shape.

In the roof molding 30 also, a leg portion 31 in which a metal core member 32 is embedded, and a decorative portion 35 disposed on the upper end of the leg portion 31 are integrally formed. The roof molding is configured so that the leg portion 31 is attached to the groove 54 of the roof of the automobile such as shown in FIG. 11, and the decorative portion 35 closes the groove 54.

The leg portion 31 of the roof molding 30 is slantly partially cut away in a range of a predetermined length from an end E of the extruded mold product 30a so as to remain the decorative portion 35 existing, in accordance with the depth of the end part of the groove 54 of the roof. Slits 37 are formed in the back face of the leg portion 31a which has undergone the cutting operation, at predetermined intervals and in a direction perpendicular to the longitudinal direction of the extruded mold product 30a. Thereafter, the metal core member 32 is cut away in a range of a predetermined length from the end E of the extruded mold product 30a. A bending process in which heat is applied is conducted so that the part where the slits 37 are formed are bent into a shape conforming to that of the groove 54 of the roof, and the end part 30b from which the metal core member 32 has been cut away has a shape which is rearward bent. From the viewpoint of maintaining the bent shape, it is further preferable to close and fix the lower end of each of the slits 37. The fixation of the lower end of each slit 37 is conducted by welding or an adhesive agent (not shown) supplied into the slit 37. From the viewpoint of maintaining the shape and preventing the metal core member 32 from being corroded, it is preferable to weld the end part 30b from which the metal core member 32 has been removed away, to the tip end 31b of the leg portion 31 from which the metal core member is not cut away. The reference numeral 33 designates lips and 36 designates the terminal which has been shaped.

In the same manner as the roof molding of the invention, the whole of the roof molding 30 having the above-described shape is formed by a single extruded mold product, and no terminal member configured by injection molding is attached to the end part of the extruded mold product 35. Therefore, no parting line exists in the decorative portion 35 and the appearance of the decorative portion is excellent. Since a terminal member is not joined to the extruded mold product, moreover, there is no fear that such a terminal member is separated from the extruded mold product because of a difference in schrinkage percentage.

Furthermore, the part from which the leg portion 31 is partially cut away has the bent shape conforming to that of the groove 54 of the roof. Even when the end parts of the groove 54 of the roof are largely curved toward the inside of the automobile, therefore, the decorative portion 35 of each terminal of the roof molding 30 is not raised from the groove 54 of the roof, so that the appearance of the roof is excellent. In the terminal 36 having the bent shape, since the slits 37 are formed in the back side of the leg portion 31a which is partially cut away, the bent shape is hardly returned to the original linear shape. In the configuration in which the lower ends of the slits 37 are closed and fixed by welding or the like, furthermore, the bent shape of the terminal is surely fixed, and hence there is no fear that the shape of the terminal will returned to the original one by a temperature change of the roof.

Next, the method of trimming the roof molding 30 of the invention will be described. The trimming method also comprises a cutting step and a bending step.

First, in the extruded mold product 30a which has been cut into a predetermined length as shown in FIG. 7A, the leg portion 31 is slantly cut away in a range of a predetermined length from the end E of the extruded mold product 30a so as to have a length (height) conforming to the depth of the groove 54 of the roof. At this time, the plural slits 37 are formed in the back of the leg portion 31a which has undergone the cutting operation, at predetermined intervals and in a direction perpendicular to the longitudinal direction of the extruded mold product 30a. The slits 37 function to facilitate the bending of the terminal of the extruded mold product in the subsequent bending step, and also to make the terminal hardly returning to the original linear shape. The depth, width, and interval of the slits 37 are adequately set in accordance with the elasticity of the extruded mold product, the bending amount, etc. The slits may have a depth at which the slits divide the metal core member 32 embedded in the leg portion 31a.

Thereafter, as shown in FIG. 7D, the metal core member 32 is removed away together with the short leg portion in a range of a predetermined length from the end E of the leg portion 31a, so that, in the end part 30b from which the metal core member 32 has been removed away, only the decorative portion 35a remains. In the end part 30b of the extruded mold product 30a from which the metal core member 32 has been removed away, both the sides are cut away as shown in FIG. 7E in order to facilitate the insertion of the product into the groove 54 of the roof.

The bending step is then conducted. In the bending step, as shown in FIG. 8A, hot plates H are respectively inserted into the slits 37 of in the leg portion 31a, and the slits 37 are heated to be softened, whereby the inner faces of the slits 37 are caused to fuse. When the front and back faces of the hot plates H are coated by fluororesin or the like, it is possible to prevent the molten resin in the slits 37 from adhering to the surfaces of the hot plates H. Preferably, the hot plates H are configured so as to be heated to a desired temperature by means of electricity or the like. Furthermore, the base of the end part 30b from which the metal core member 32 has been cut away is heated from the back side by a heater or the like, so that the resin of the base is softened, thereby causing the back face to fuse.

Thereafter, the hot plates H are removed from the slits 37. As shown in FIG. 8B, the terminal 36 of the extruded mold product 30a is placed in pressing dies 41 and 42 having a curved shape conforming to the ends of the groove 54 of the roof, and the terminal is then pressed into the shape corresponding to the die faces. In the pressing process, the existence of the slits 37 enables the terminal 36 of the extruded mold product to be easily bent into the shape corresponding to the die faces, and the lower ends of the slits 37 to be closed and welded. At the same time, the end part 30b from which the metal core member has been cut away is welded to the tip end (31b of FIG. 6) of the leg portion from which the metal core member is not cut away. After the terminal 36 of the extruded mold product 30a is cooled, the terminal is removed from the dies, with the result that the terminal of the roof molding 30 shown in FIG. 6 which has the bent shape conforming to the ends of the groove 54 of the roof is obtained. The heating of the slits 37 and the like may be performed on the pressing die 42.

The fixation of the lower ends of the slits 37 may be conducted by employing the following technique, in place of the fusing fixation of the slits 37. An adhesive agent (not shown) is charged into the slits 37, and during the bending process the lower ends of the slits 37 are closed and bonded. Also in the bending process using an adhesive agent, preferably, the vicinity of the end part where the slits 37 are formed is heated by a heater or the like so as to be easily bent.

As described with reference to the figures, according to the invention of the roof molding, the whole of the roof molding is formed by a single extruded mold product, and no terminal member configured by injection molding is attached to the end of the extruded mold product. Therefore, no parting line exists and the appearance of the decorative portion is excellent. Furthermore, there is no fear that a crack is formed along such a join line and such a terminal member is separated from the extruded mold product. As a result, the effect of superior durability is attained. Since an end part of the extruded mold product is rearward bent after the metal core member is removed away from the end, the appearance of the end face of the roof molding is excellent, and the rigidity of the metal core member does not impede the bending, so that the bent shape of the end part is prevented from being impaired.

According to the invention, the following effects are attained in addition to the above-mentioned effects. A terminal of the extruded mold product has a bent shape conforming to an end part of a groove of a roof. Even when the end part of the groove of the roof is largely curved toward the inside of the automobile, therefore, the terminal of the roof molding is not raised from the end part of the groove of the roof, so that an excellent appearance of the roof is obtained. The existence of the slits in the back side of the terminal produce an effect that the terminal of the roof molding is hardly returned to have the original linear shape.

According to the invention, since the lower end of the slits is closed and fixed, the bent shape of the terminal of the roof molding is surely fixed, and hence there is no fear that the shape of the terminal will returned to the original one.

By contrast, according to the invention of the method of trimming a roof molding, it is possible to easily obtain a terminal of a roof molding which has an excellent appearance and has no fear of separation as described above. According to the invention, it is possible to easily obtain a terminal of a roof molding which, is not raised from the end part of the groove of the roof even when an end part of a groove of a roof is largely curved.

What is claimed is:

1. A method of trimming a roof molding for an automobile, consisting of an extruded mold product in which a leg portion and a decorative portion formed on an upper end of said leg portion are integrally formed, a metal core member being embedded in said leg portion, said leg portion being fitted into a groove of an outer face of a roof of an automobile, said decorative portion closing said groove, said method comprising:

a cutting step of partially cutting away said leg portion in a range of a predetermined length from an end of said extruded mold product, in accordance with a depth of an end part of said groove of said roof, and cutting away said metal core member in the vicinity of an end part of said extruded mold product; and a bending step of rearward bending said end part from which said metal core member has been cut away, and heat is applied thereon.

2. A method of trimming a roof molding for an automobile, consisting of an extruded mold product in which a leg portion and a decorative portion formed on an upper end of said leg portion are integrally formed, a metal core member being embedded in said leg portion, said leg portion being fitted into a groove of an outer face of a roof of an automobile, said decorative portion filling said groove, said method comprising:

a cutting step of partially cutting away said leg portion in a range of a predetermined length from an end of said extruded mold product, in accordance with a depth of an end part of said groove of said roof, forming slits in a back face of said cutaway part, and cutting away said metal core member in the vicinity of an end part of said extruded mold product; and a bending step of bending the part in which said slits are formed into a shape corresponding to said end part of said groove of said roof, and warping backward said end part from which said metal core member has been cut away, and heat is applied thereon.

3. A method of trimming a roof molding for an automobile according to claim 2, wherein, in said bending step, a hot plate is inserted into said slits to thermally fuse said slit, said hot plate is then removed away, and the part in which said slits are formed is bent, thereby closing and welding an open end of said slits.

4. A method of trimming a roof molding for an automobile according to claim 2, wherein, in said bending step, an adhesive agent is charged into said slit, and the part in which said slits are formed is then bent, thereby closing and fixing an open end of said slits.

5. A method of making a finished extruded mold product for insertion into a groove that has a varying depth, the method comprising the steps of:

(1) providing an extruded mold article having a leg portion, a decorative portion, and a support core member all extending in a longitudinal direction of the article, the leg portion also extending downward from the decorative portion so that a section of the article taken in a plane orthogonal to the longitudinal direction has an approximate T-shape defined by the decorative portion and the leg portion, wherein the decorative portion and the leg portion are integrally formed during the extrusion of the article, and the support core member is embedded in the article;

(2) cutting the article to a predetermined length measured in the longitudinal direction so as to define a first end and a second end, the predetermined length corresponding to a length of a groove in which the finished extruded mold product is to be inserted;

(3) cutting away part of the leg portion and the support core member around the second end of the article in a manner corresponding to the varying depth of the groove; and (4) bending the decorative portion at or near the second end where part of the support core member has been cut away.

6. The method according to claim 5, wherein the support core member is a metal core member.

7. The method according to claim 6, wherein cutting away part of the leg portion is performed separately from cutting away part of the metal core member around the second end of the article.

8. The method according to claim 6, wherein cutting away part of the leg portion and the metal core member around the second end of the article leaves an end part at the second end having only the decorative portion; and wherein the step of bending the decorative portion involves bending the end part towards the remaining leg portion and metal core so as to seal an end of the metal core with the bent end part.

9. The method according to claim 6, further comprising the steps of forming slits in the leg part that extend in a direction orthogonal to the longitudinal direction, and fixing open ends of adjacent slits to each other to close the opens ends of the slits.

10. The method according to claim 9, wherein the step of forming slits includes cutting the metal core into a plurality of sections corresponding to the slits.

11. The method according to claim 5, wherein the step of cutting away part of the leg portion is performed at a slant with respect to the longitudinal direction.

12. The method according to claim 5, wherein the article includes a lip formed on the leg portion and extending in the longitudinal direction, and wherein the step of cutting part of the leg portion includes cutting away part of the lip.

* * * * *